United States Patent [19]

Torneback

[11] 4,124,131
[45] Nov. 7, 1978

[54] ARRANGEMENT FOR SLIDING THE LOAD CARRIER OF A LONG TRAILER TO AND FRO

[76] Inventor: Goran Torneback, Box 12046, S-580 12 Linkoping, Sweden

[21] Appl. No.: 692,194

[22] Filed: Jun. 2, 1976

[30] Foreign Application Priority Data

Jun. 5, 1975 [SE] Sweden ............................ 7506422

[51] Int. Cl.² .............................................. B60P 1/64
[52] U.S. Cl. ................................ 214/83.24; 91/508; 92/96; 137/312; 214/518
[58] Field of Search ............................ 214/83.24, 516; 280/638; 296/26; 92/86, 96; 91/411; 137/312-314

[56] References Cited

U.S. PATENT DOCUMENTS

| 2,471,579 | 5/1949 | Neuroth | 92/96 |
| 2,674,267 | 4/1954 | McCarvell | 137/312 X |
| 3,868,890 | 3/1975 | Roberts et al. | 92/86 |

FOREIGN PATENT DOCUMENTS 367,792  9/1974  Sweden ............................ 214/83.24

Primary Examiner—Robert G. Sheridan
Attorney, Agent, or Firm—Neil F. Markva

[57] ABSTRACT

A mechanism for moving a slidable load carrier to and fro along a trailer includes a hydraulic double-acting servomotor having a piston rod which selectively engages with one or other of two sets of oppositely directed lugs, in the form of ratchet teeth, carried by a channel member fixed to the underside of the load carrier. The hydraulic servomotor is pivotally mounted on the trailer. The sets of ratchet teeth engaged are selected, for movement in either a forward direction or backward direction, by adjusting the angle of inclination of the hydraulic servomotor in a vertical plane. The hydraulic servomotor is controlled by a pneumatic servomotor coupled through a horizontally extending operating rod. The pneumatic control servomotor has a diaphragm disposed in a vertical plane in a casing which is provided at the bottom with a drain valve for removing water condensed within the interior.

2 Claims, 7 Drawing Figures

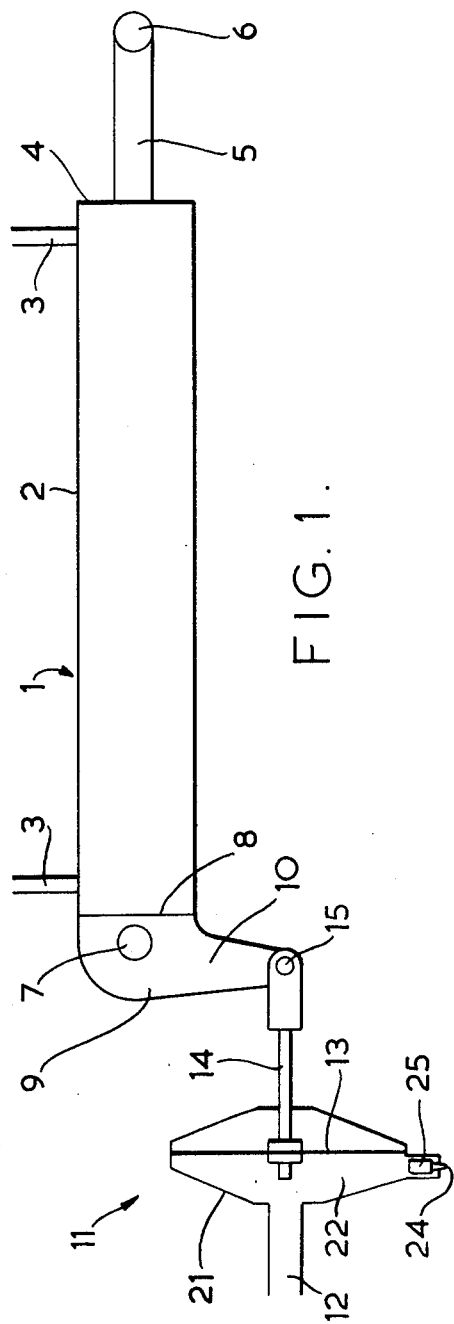

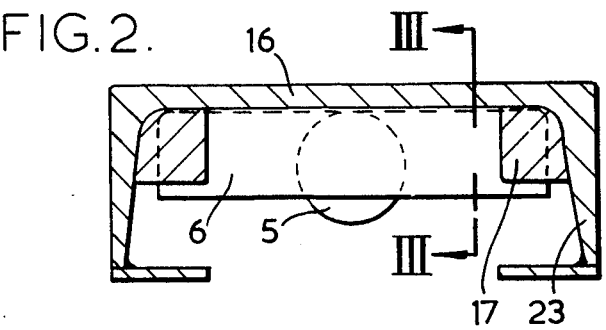
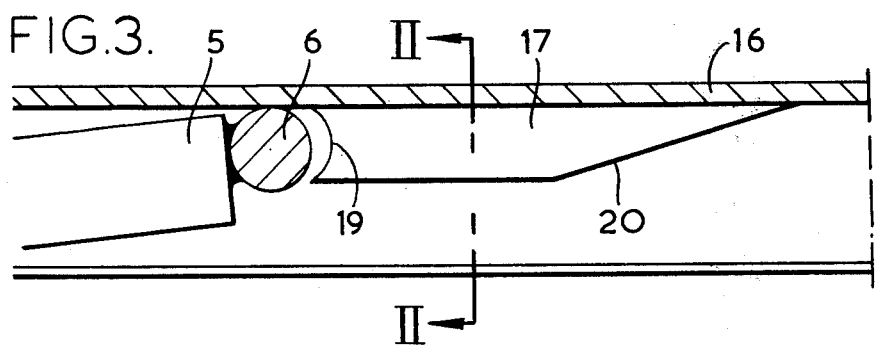
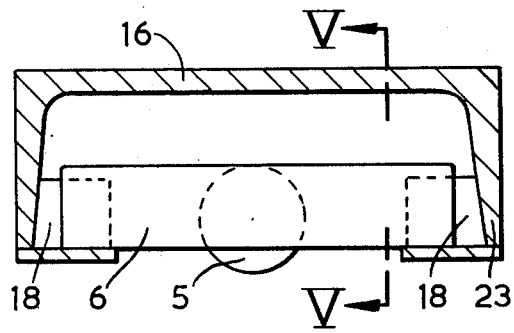
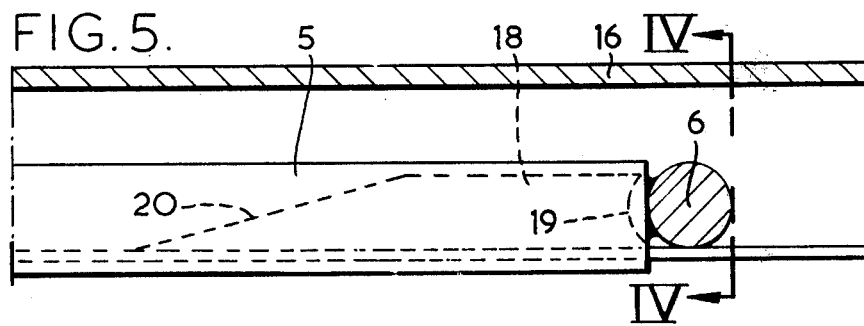

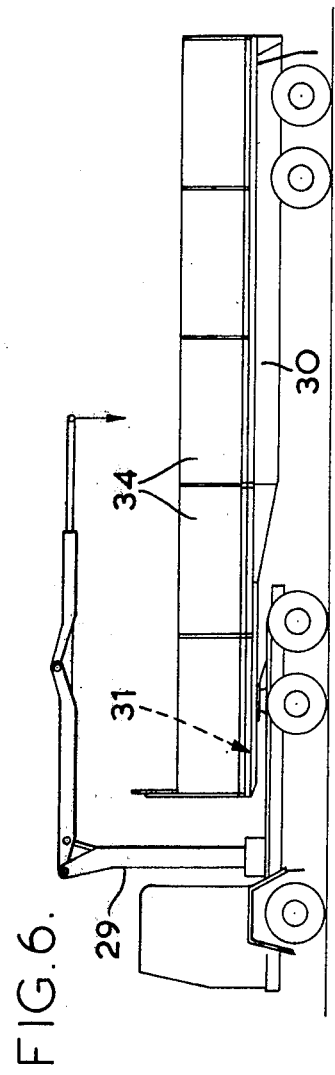
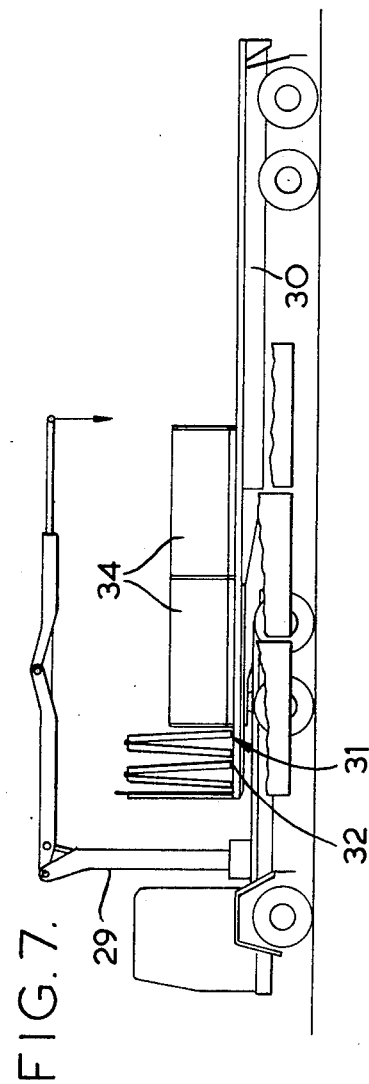

ARRANGEMENT FOR SLIDING THE LOAD CARRIER OF A LONG TRAILER TO AND FRO

BACKGROUND OF THE INVENTION

Swedish Pat. No. 367,792 describes a method of fitting long trailers with load carriers capable of sliding to and fro. In order to slide the load carriers, a longitudinal downward-facing C-section girder or channel member having flat vertical flanges and flat web is fixed centrally to the underside of the load carrier. The vertical flanges has a series of pairs of lugs attached along their upper and lower edges. The trailer chassis is fitted with a backward-facing hydraulic double-acting straight piston servomotor having a fully-closed endplate provided with a lug by means of which it can pivot on a transverse journal so that the piston rod end of the servomotor can pivot in a vertical plane. The free end of the piston rod has a crosspiece arranged to limit the pivoting motion of the servomotor. And, when the crosspiece is in an upper limit position and is being pushed backwards, it is also arranged to engage with a pair of the upper lugs on the C-girder and by means of these to push the load carrier backwards. When the crosspiece is in a lower limit position and is being pulled forward, it is arranged to engage with a pair of the lower lugs of the C-girder and by means of these to pull the load carrier forwards. The ends of the lugs facing away from a mainly vertical striking surface are each bevelled appropriately to function like ratchet teeth so that the crosspiece can slide thereover when pushed in the opposite direction. This makes it possible, by means of a relatively short servomotor, to push the load carrier any required distance.

In the known arrangement referred to above, the hydraulic servomotor is pivoted upwards by a vertically-acting pneumatic piston or bellows servomotor provided under the pivoting end of its cylinder. However, it has been found that such pneumatic piston or bellows servomotors can be subject to failures at temperatures below 0° C., caused by water condensing, from the compressed air supplied thereto, and freezing to ice.

It is accordingly one object of the present invention to provide an arrangement in which the above problem may be reduced or overcome.

SUMMARY OF THE INVENTION

Thus, one aspect of the present invention provides a mechanism for moving and positionally adjusting a slidably mounted load carrier longitudinally along a long trailer of a transport vehicle wherein a downwardly-facing longitudinal channel member is disposed on the underside of said load carrier. Upper and lower rows of lugs extending along the length of said channel member and are adapted to be operatively engaged by a head portion of a piston rod of a rearwardly-directed linear double-acting piston hydraulic servomotor. The hydraulic servomotor is carried by a pivot mounting on said trailer so as to be able to pivot in a vertical plane between an upper limit position of maximum angular elevation and a lower limit position of lesser angular elevation. In the upper limit position, the piston rod head portion engages said upper row of lugs and co-operates therewith so that when the hydraulic servomotor operates to move the piston rod in one direction the load carrier is caused to be moved in the same direction. In the lower limit position the piston rod head portion engages said lower row of lugs and co-operates therewith so that when the hydraulic servomotor operates to move the piston rod in the opposite direction the load carrier is caused to be moved also in said opposite direction. Pneumatically actuated control means are provided for controlling movement and change in the angular elevation of the hydraulic servomotor between said lower limit and upper limit positions. The control means comprises a pneumatic servomotor and means operatively connecting said pneumatic servomotor to said hydraulic servomotor. The pneumatic servomotor includes a casing and drainage means enabling any water condensed within the interior of said casing to drain out therefrom.

BRIEF DESCRIPTION OF DRAWINGS

The invention is illustrated by way of example in the accompanying drawings, in which:

FIG. 1 shows one form of a hydraulic double-acting piston servomotor fitted with a pivoting arrangement designed for use in mechanism according to the invention;

FIG. 2 shows a cross-section through a C-section girder or channel member of a trailer load carrier associated with mechanism in accordance with the invention, a crosspiece head portion of the piston rod of the hydraulic piston servomotor being shown in its upper limit position;

FIG. 3 shows a partial longitudinal section through the C-section girder or channel member of the arrangement of FIG. 2 with the crosspiece again in its upper limit position and close to engaging with one of a series of upper lugs;

FIG. 4 shows a cross-sectional view similar to FIG. 2 but showing the crosspiece in its lower limit position;

FIG. 5 shows a partial longitudinal section similar to FIG. 3 but with the crosspiece in its lower limit position and about to engage with one of a series of lower lugs; and FIG. 6 and 7 are two views of a long trailer transport vehicle having a slidably-mounted movable load carrier fitted with mechanism in accordance with the invention.

DESCRIPTION OF SPECIFIC EMBODIMENTS

The trailer vehicle shown in FIGS. 6 and 7, which is also equipped with a loading crane 29, has a long trailer chassis 30. A slidably mounted load carrier 31 comprises, for example, a plurality of interconnected spaced-apart transverse load bearers 32 slidable along the length of the trailer as more fully described in the aforesaid Swedish Pat. No. 367792. Some of transverse load bearers 32 adjacent the forward end of the load carrier are conveniently interconnected by articulated linkages. However, at least some others have affixed underneath a central longitudinally-extending C-section girder or channel member, also as described in the Swedish Pat. No. 367792, accommodated in a recess of the trailer chassis 30. The load carrier 31 is shown as supporting a number of separate box-like load containers 34 in this example.

Referring to FIG. 1, the straight, double-acting piston hydraulic servomotor 1 comprises a cylinder 2 with a closed end plate 8 at one end. At the other end, piston rod 5 projects through a second end plate 4 in which it can slide and is sealed. The free end of piston rod 5 has a head portion formed by a crosspiece 6 fitted to it.

Close to its ends 4, 8, the cylinder 2 is provided with inlets and outlets 3 for hydraulic fluid under pressure.

The closed end plate 8 of cylinder 2 is fitted with a lug 9 projecting from it at right angles and pivoting on a transverse journal 7 carried by the chassis 30 of the trailer shown in FIGS. 6 and 7.

Lug 9 has a depending pivot arm 10 projecting substantially at right angles to cylinder 2. The free lower end of this arm 10 is fitted with a journal 15.

A pneumatically actuated diaphragm servomotor 11 comprises a casing or housing 21 having an interior working chamber 22 partitioned off by a flexible diaphragm 13. Working chamber 22 can be connected, in known manner, via inlet 12 alternately with a compressed-air source (not shown) carried by the vehicle and with the free atmosphere. One end of an operating rod 14 is fixed to diaphragm 13 and the other end pivots on journal 15, so that it causes crosspiece 6 to be pivoted upwards when inlet 12 is connected to the compressed-air source and downwards when inlet 12 is connected to the free air.

Referring now more specifically to FIGS. 2 to 5, the C-section girder 16 is fixed with its opening facing downwards to the underside of the load carrier 31 that is capable of sliding along the trailer chassis 30. The vertical flanges 23 of C-section girder 16 are provided at top and bottom with a series of lugs 17, 18 having at one end substantially vertical striking surfaces 19, the other end 20 of each of said lugs being bevelled. The upper and lower rows of lugs 17, 18 face in opposite directions.

The crosspiece 6 of the piston rod 5 is arranged so that in its upper and lower positions it works in conjunction with lugs 17, 18. In its upper limit position, for example, when the piston rod 5 is pushed out, crosspiece 6 engages with one pair of the upper lugs 17 and pushes these, and with them the load carrier, backwards on the trailer 30. In its lower limit position crosspiece 6 engages with a pair of the lower lugs 18 and pulls these, and with them the load carrier, forwards on the trailer 30.

The distance between two adjacent pairs of lugs 17, 18 is slightly less than the stroke of piston servomotor 1.

The diaphragm servomotor 11 is arranged is such a way that its diaphragm 13 is disposed in a substantially vertical plane. The operating rod 14 extends horizontally (see FIG. 1), and the casing 21 of servomotor 11 is provided at the bottom with a drain valve 24 operated by a float 25. By this means, any water condensing within the interior in the working chamber 22 can be drained off, thereby avoiding difficulties due to freezing at low temperatures.

FIGS. 6 and 7 also demonstrate the usefulness of the movable load carrier for enabling a crane of relatively small reach to be used for loading or unloading containers on a long trailer.

Although only one form of carrying out the invention is shown and described above, it will of course be understood that other forms are possible within the scope of the invention as defined in the appended claims.

I claim:

1. A mechanism for moving and positionally adjusting a slidably mounted load carrier longitudinally along a long trailer of a transport vehicle, said mechanism comprising:

(a) a downwardly-facing longitudinal channel member disposed on the underside of said load carrier,
(b) upper and lower rows of lugs extending along the length of said channel member,
(c) a rearwardly-directed linear double-acting piston hydraulic servomotor having a head portion on a piston rod,
(d) said lugs being adapted to be operatively engaged by said head portion,
(e) said hydraulic servomotor being pivotally mounted on said trailer to pivot in a vertical plane between an upper limit position of maximum angular elevation and a lower limit position of lesser angular elevation,
(f) in said upper limit position, the piston rod head portion engages said upper row of lugs and cooperates therewith so that when the hydraulic servomotor operates to move the piston rod in one direction the load carrier is caused to be moved in the same direction,
(g) in said lower limit position of lesser angular elevation, the piston rod head portion engages said lower row of lugs and cooperates therewith so that when the hydraulic servomotor operates to move the piston rod in the opposite direction the load carrier is caused to be moved also in said opposite direction, and
(h) pneumatically actuated control means for controlling movement and change in the angular elevation of the hydraulic servomotor between said lower limit and upper limit positions,
(i) said control means including a pneumatic servomotor to said hydraulic servomotor,
(j) said pneumatic servomotor including a casing and means for draining any water condensed within the interior of said casing out of said casing by force of gravity,
(k) the pneumatic servomotor is a single-acting diaphragm servomotor arranged with its diaphragm disposed in a substantially vertical plane within said casing,
(l) said draining means includes an opening located at the bottom of said pneumatic servomotor,
(m) the draining means of the pneumatic servomotor includes a float-operated drain valve disposed in the opening at the bottom of the casing,
(n) the hydraulic servomotor has an actuating arm depending therefrom adjacent said pivot mounting, and
(o) the pneumatic servomotor has an elongate operating member extending substantially horizontally and said member being pivotally connected to said actuating arm.

2. A combination for sliding the load carrier of a long trailer to and fro, said combination comprising:

(a) a downwardly-facing C-section channel member centrally fixed to the underside of the load carrier,
(b) rows of lugs disposed in upper and lower pairs along the sides of the C-section girder,
(c) a backward-facing hydraulic double acting straight piston servomotor having a piston rod with a crosspiece attached to the free end thereof,
(d) said lugs being arranged to be engaged by said crosspiece,
(e) the piston servomotor being mounted to pivot between an upper limit position and a lower limit position,
(f) in the upper limit position, the crosspiece acts on one pair of the upper lugs in such a way that, when the piston rod pushes the crosspiece backward they cause the load carrier to be moved backward, and (g) in the lower limit position, the crosspiece acts on one pair of the lower lugs in such a way that, when the piston rod pulls the crosspiece forward, they cause the load carrier to be moved forward, (h) the piston servomotor has at its pivoting end a downward-pointing arm having a free end, and (i) a pneumatic servomotor being connected to actuate said free end so that said arm turns the piston servomotor angularly between the above-mentioned limit positions, (j) said pneumatic servomotor has a casing and means for draining by force of gravity out of said casing water condensed within the interior of said casing, (k) the pneumatic servomotor is a single-acting diaphragm servomotor arranged with its diaphragm disposed in a substantially vertical plane within said casing, (l) said draining means includes an opening located at the bottom of said pneumatic servomotor, (m) the pneumatic servomotor has an elongate operating member extending substantially horizontally and said member being pivotally connected to said down-pointing arm.

* * * * *